(12) United States Patent
Valeij

(10) Patent No.: US 6,520,725 B1
(45) Date of Patent: Feb. 18, 2003

(54) HOLDER FOR INTERCONNECTING COMPONENTS

(75) Inventor: Thomas Valeij, Huddinge (SE)

(73) Assignee: Siemens-Elema AB, Solna (SE)

( * ) Notice: Subject to any disclaimer, the term of this patent is extended or adjusted under 35 U.S.C. 154(b) by 0 days.

(21) Appl. No.: 09/913,607
(22) PCT Filed: Feb. 24, 2000
(86) PCT No.: PCT/SE00/00363
§ 371 (c)(1),
(2), (4) Date: Aug. 15, 2001
(87) PCT Pub. No.: WO00/58634
PCT Pub. Date: Oct. 5, 2000

(30) Foreign Application Priority Data

Mar. 26, 1999 (SE) ................................................. 9901119

(51) Int. Cl.$^7$ ................................................. F16B 21/00
(52) U.S. Cl. ........................ 411/553; 411/551; 411/552
(58) Field of Search ................................ 411/549, 550, 411/551, 552, 553, 554

(56) References Cited

U.S. PATENT DOCUMENTS

| | | | | |
|---|---|---|---|---|
| 3,152,822 A | * | 10/1964 | Griffiths | 411/549 X |
| 5,044,856 A | * | 9/1991 | Jerabek | 411/551 |
| 5,370,488 A | * | 12/1994 | Sykes | 411/552 X |
| 5,593,265 A | * | 1/1997 | Kizer | 411/552 |

FOREIGN PATENT DOCUMENTS

| EP | 0 536 923 | 4/1993 |
|---|---|---|
| WO | WO 88/10374 | 12/1988 |

* cited by examiner

*Primary Examiner*—Neill Wilson
(74) *Attorney, Agent, or Firm*—Schiff Hardin & Waite

(57) ABSTRACT

A holder for connection to a first unit has a locking device designed for insertion, in a first position, into a receiving part in the first unit and, in a second position, for locking the holder to the first unit, is described. The holder's locking device has a threaded locking shaft arranged for axial movement in the holder, a handle with a threaded hole for admitting the locking shaft and a locking element rigidly connected to the locking shaft. The holder also has at least one beveled shoulder against which the locking element is axially movable, the handle axially pulling the locking shaft, as well as the locking element, against the beveled shoulder when rotated for locking, thereby inducing simultaneous rotation of the locking element to lock the holder to the receiving part.

4 Claims, 2 Drawing Sheets

HOLDER FOR INTERCONNECTING COMPONENTS

BACKGROUND OF THE INVENTION

1. Field of the Invention

The present invention is directed to a holder of the type for interconnecting different components.

2. Description of the Prior Art

When different components are interconnected, such as instruments on devices, rails etc., the connection must be firm and stable. It would also be advantageous if assembly, disassembly and holder repositioning could be performed quickly and simply.

SUMMARY OF THE INVENTION

An object of the present invention is to achieve a holder with the desired characteristics.

The above object is achieved in accordance with the principles of the present invention in a holder for attachment to a first unit having a locking device for insertion, in a first position, into a receiving part in the first unit and for locking, in a second position, the holder to the first unit, wherein the locking device has a threaded shaft which is axially movable in the holder, a handle with a threaded bore for receiving the threaded shaft, and a locking element rigidly connected to the locking shaft. The holder further has at least one beveled shoulder, against which the locking element is axially movable. When rotated, the handle pulls the shaft as well as the locking element axially against the beveled shoulder, causing simultaneous rotation of the locking element, in order to lock the holder to the receiving part.

The inventive design with simultaneous axial motion and locking rotation makes it possible to devise a locking element for axial insertion into a groove or corresponding receiving part in the unit to which the holder is to be connected. The locking element is then screwed in, whereupon a beveled shoulder or shoulders force(s) the locking device to rotate and assume a locking position against contact surfaces in the receiving part. This greatly facilitates both assembly and disassembly.

Spring loading of the locking element ensures that the device always reverts to its original position in disassembly.

When the locking shaft and locking element are devised as a single component, the number of components in the locking device is kept to a minimum.

DESCRIPTION OF THE PREFERRED EMBODIMENTS

Figure 1:
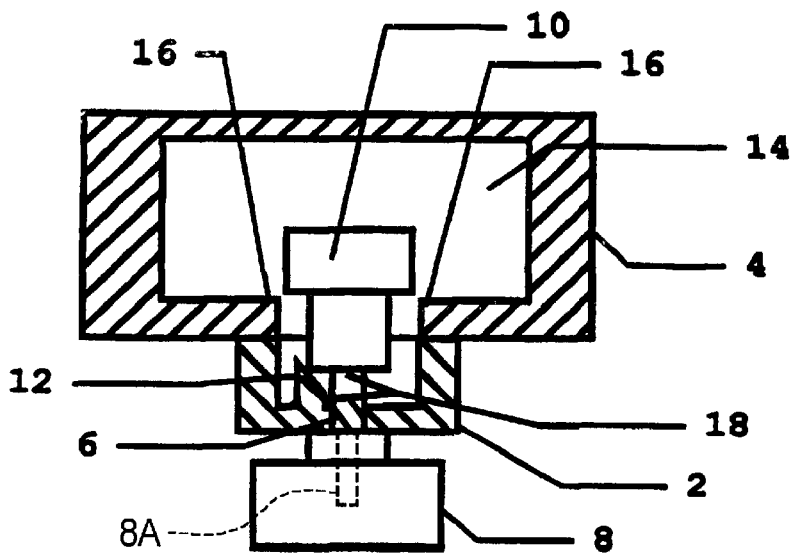
FIG. 1 is a sectional view of a holder in accordance with the invention in a first, non-locking position relative to a unit.
Figure 2:
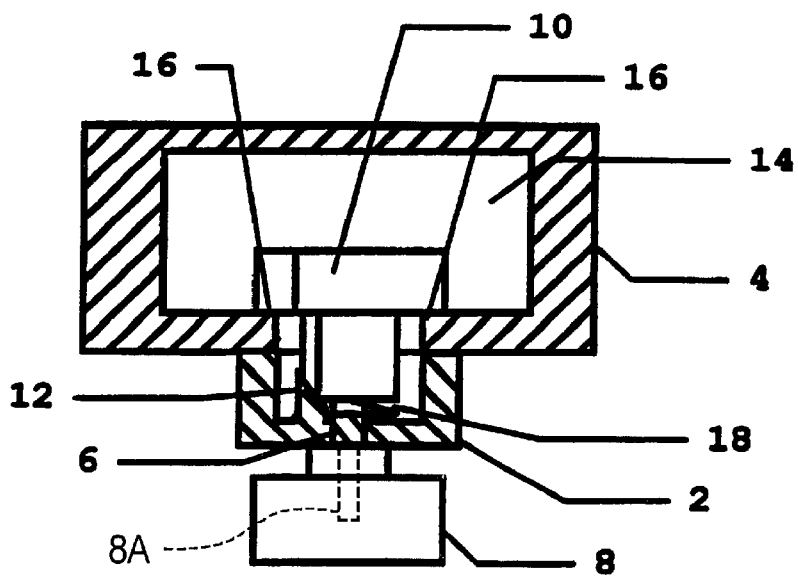
FIG. 2 is a sectional view of the holder of FIG. 1 shown in a second, locking position relative to the unit.

FIGS. 1 and 2 illustrate the locking principle of the holder according to the invention, and the following description therefore refers to both.

The holder has a load-bearing part 2 that, in this instance, has been brought to bear against a first unit 4 for connection. A locking shaft 6, one end of which is threaded and is received in a threaded bore 8A of a handle 8, is arranged for axial movement in the load-bearing part 2. Turning the handle 8 screws the locking shaft 6 into the handle 8. At its other end, the locking shaft 6 is rigidly attached to a locking element 10. Two beveled shoulders 12 (only one is shown) are arranged in the load-bearing part 2. The beveled shoulders 12 are arranged in such a way that the locking element 10 is forced to rotate when the handle 8 performs an axial movement.

The first unit 4 has a channel 14. The channel 14 is preferably longitudinal and can e.g. be a groove, such as a T groove. The first unit 4 has edges 16 at the opening of the channel 14 making the opening narrower than the channel 14. The widths of the opening and the locking element 10 are tailored to each other to enable the locking element 10 to be inserted through the opening.

When the holder is connected to the first unit 4, the locking element 10 is accordingly inserted into the channel 14 through the opening in the first unit 4.

The handle 8 is then rotated, thereby screwing the locking shaft 6 into the handle 8. The locking element 10 is then pulled against the beveled shoulders 12, forcing the locking element 10 to rotate. The rotation causes part of the locking element 10 to come into contact with the edges 14, and they are clamped between the load-bearing part 2 and the locking element 10, thereby connecting the holder to the first unit 4.

For detachment, the handle 8 is turned in the opposite direction to unscrew the locking shaft 6. The locking element 10 can then be lifted off the beveled shoulders 14 and turned back to its original position. The holder can then be easily detached from the first unit 4.

To facilitate the return of the locking element 10 to its original position, a torsion bar 18, in this instance, is arranged in the load-bearing part 2 and attached to the locking shaft 6. The torsion bar 18 is set up so it tensions when the locking element 10 is rotated during locking. The holder could also contain a pressure spring that exerts axial pressure on the locking element 10 when the holder is to be detached. However, this is not shown in the figures.

Figure 3:
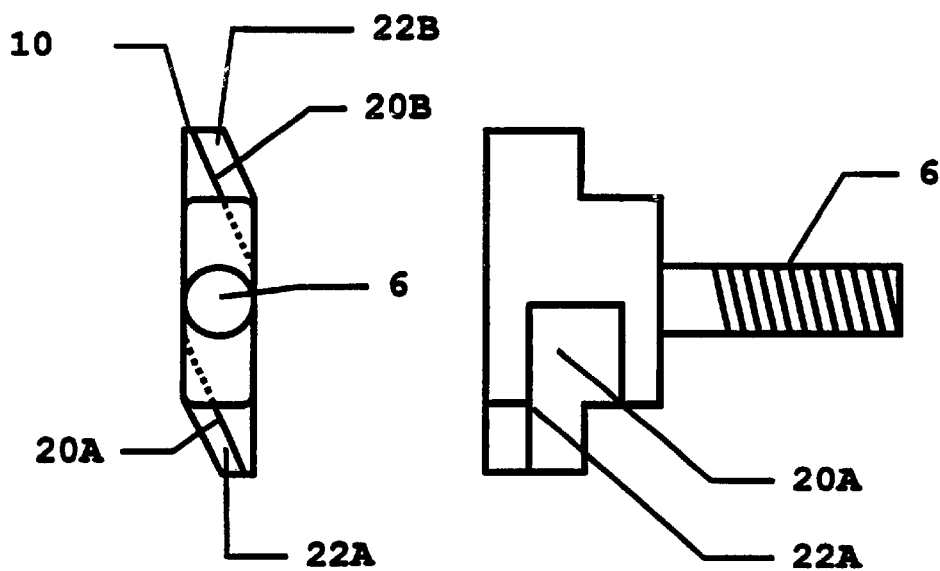
FIG. 3 shows the locking element and the shaft inside the holder in accordance with the invention.

FIG. 3 shows a conjoined locking element 10 and locking shaft 6. It clearly shows the threaded part of the locking shaft 6. The use of a compound component means that the holder has fewer parts and is easier to fabricate and assemble. The depicted design for the locking element 10 also comprises a bevel 20A, 20B on both sides. The contact surfaces 22A, 22B, which will press against the edges of the first unit, are arranged at the bevels 20A, 20B. These bevels 20A, 20B enable the locking element 10 to be relatively tall, thereby increasing handle stability.

Figure 4:
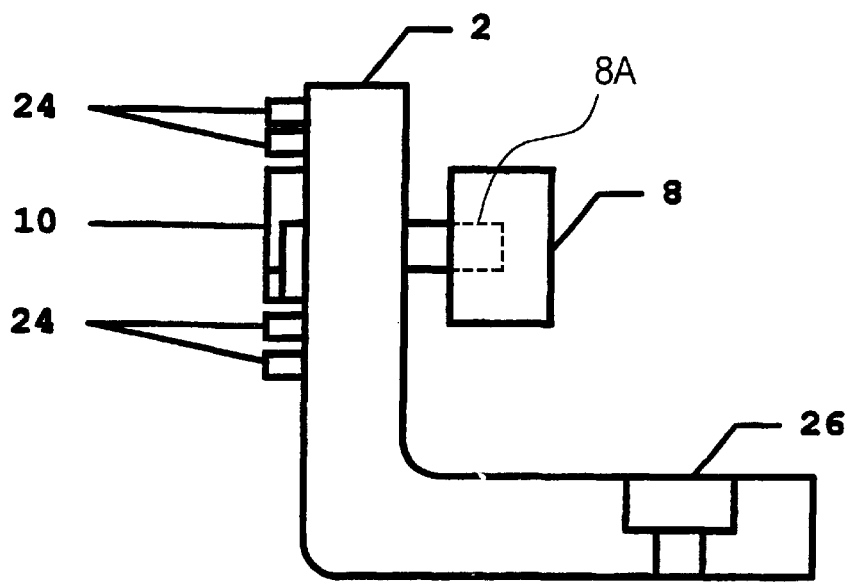
FIG. 4 is a side view of the entire inventive holder.

FIG. 4 shows a version of the holder for the attachment of additional units (not shown in the FIG.) The load-bearing part 2 is essentially L-shaped in this instance. The handle 8 with the locking device (only the locking element 10 is visible) is on one leg. Guiding elements 24 are also arranged on the load-bearing part 2. In connection to the first unit, they are also inserted into the opening to contribute stability when the entire handle is subjected to torsional loading.

A connector part 26 for additional units is arranged on the other leg of the load-bearing part 2. They can be e.g. screwed onto the load-bearing part 2.

One example of the use of the holder according to the invention is in respiratory care. The holder can be connected to a T-groove rail (or the like) carrying a carriage for a respirator. Articulated arms can then be attached to the holder to hold infusion bags or different kinds of instruments. However, the holder can be used in all areas in which detachable connection of different units is desired.

Although modifications and changes may be suggested by those skilled in the art, it is the intention of the inventor to embody within the patent warranted hereon all changes and modifications as reasonably and properly come within the scope of his contributions to the art.

What is claimed is:

1. A holder comprising:
   a load-bearing element adapted for pressing against a component;
   a threaded shaft proceeding through said load-bearing element and axially movable relative thereto, said threaded shaft having a first end adapted for insertion into said component and a second end projecting outside of said load bearing element;
   a handle having a threaded bore receiving said second end of said threaded shaft;
   a locking element rigidly connected to said locking shaft; and
   a beveled shoulder disposed in an interior of said load-bearing element and against which said locking element is axially movable, and wherein rotation of said handle screws said threaded shaft into said threaded bore to pull said locking shaft and said locking element axially against said beveled shoulder causing rotation of said locking element from a first position wherein said locking element is insertable into said component to a second position wherein said locking element is pressed against said component to hold said loading-bearing part against said component.

2. A holder as claimed in claim 1 wherein said handle is rotated in a first direction for causing said locking element to rotate from said first position to said second position, and wherein said holder further comprises a spring disposed in said interior of said load bearing element and interacting with said load-bearing element and said locking element to return said locking element to said first position when said handle is rotated in a second direction opposite to said first direction.

3. A holder as claimed in claim 1 wherein said shaft and said locking element form a single, unitary piece.

4. A holder as claimed in claim 1 wherein said load-bearing element comprises a holder part adapted for holding a second component.

* * * * *